United States Patent
Planeta et al.

(10) Patent No.: US 10,967,615 B2
(45) Date of Patent: Apr. 6, 2021

(54) MULTILAYER BARRIER FILM

(71) Applicant: Macro Technology Inc., Ontario (CA)

(72) Inventors: Miroslav Planeta, Ontario (CA); Harinder Tamber, Ontario (CA)

(73) Assignee: Macro Technology Inc., Ontario (CA)

( * ) Notice: Subject to any disclaimer, the term of this patent is extended or adjusted under 35 U.S.C. 154(b) by 0 days.

(21) Appl. No.: 16/077,902

(22) PCT Filed: Feb. 15, 2017

(86) PCT No.: PCT/CA2017/050194
§ 371 (c)(1),
(2) Date: Aug. 14, 2018

(87) PCT Pub. No.: WO2017/139884
PCT Pub. Date: Aug. 24, 2017

(65) Prior Publication Data
US 2019/0054721 A1    Feb. 21, 2019

Related U.S. Application Data

(60) Provisional application No. 62/295,171, filed on Feb. 15, 2016.

(51) Int. Cl.
*B32B 27/08* (2006.01)
*B32B 7/12* (2006.01)
(Continued)

(52) U.S. Cl.
CPC ............. *B32B 27/08* (2013.01); *B32B 7/12* (2013.01); *B32B 27/16* (2013.01); *B32B 27/18* (2013.01);
(Continued)

(58) Field of Classification Search
CPC ........... B32B 2250/05; B32B 2250/24; B32B 2270/00; B32B 2307/306; B32B 2307/406; B32B 2307/50; B32B 2307/518; B32B 2307/54; B32B 2307/546; B32B 2307/5825; B32B 2307/72; B32B 2307/7244; B32B 2307/7246; B32B 2307/7248; B32B 2307/732;
(Continued)

(56) References Cited

U.S. PATENT DOCUMENTS 2,762,720 A    9/1956    Michel
3,022,543 A    2/1962    Baird, Jr. et al.
(Continued)

FOREIGN PATENT DOCUMENTS

EP    1062093 B1    5/2003

OTHER PUBLICATIONS

Tournier et al (WO 00/76765 machine translation) Dec. 21, 2000.*

*Primary Examiner* — Lawrence D Ferguson
(74) *Attorney, Agent, or Firm* — Husch Blackwell LLP

(57) ABSTRACT

A multilayer plastic film or sheet having a series of component layers and optional bonding layers tying said component layers together is provided. The multilayer film or sheet comprises a central barrier layer comprising first and second layers of polyvinylidene chloride polymer bonded together with a tie or bonding layer, an outer layer adjacent to an outer side of the first PVDC layer, and a sealant layer adjacent to an outer side of the second PVDC layer.

20 Claims, 4 Drawing Sheets

(51) Int. Cl.
*B32B 27/30* (2006.01)
*B32B 27/32* (2006.01)
*B32B 27/36* (2006.01)
*B32B 27/34* (2006.01)
*B32B 27/18* (2006.01)
*B32B 27/22* (2006.01)
*B32B 27/16* (2006.01)

(52) U.S. Cl.
CPC ............ *B32B 27/22* (2013.01); *B32B 27/302* (2013.01); *B32B 27/304* (2013.01); *B32B 27/306* (2013.01); *B32B 27/308* (2013.01); *B32B 27/32* (2013.01); *B32B 27/325* (2013.01); *B32B 27/327* (2013.01); *B32B 27/34* (2013.01); *B32B 27/36* (2013.01); *B32B 2250/05* (2013.01); *B32B 2250/24* (2013.01); *B32B 2270/00* (2013.01); *B32B 2307/306* (2013.01); *B32B 2307/406* (2013.01); *B32B 2307/50* (2013.01); *B32B 2307/518* (2013.01); *B32B 2307/54* (2013.01); *B32B 2307/546* (2013.01); *B32B 2307/5825* (2013.01); *B32B 2307/72* (2013.01); *B32B 2307/7244* (2013.01); *B32B 2307/7246* (2013.01); *B32B 2307/7248* (2013.01); *B32B 2307/732* (2013.01); *B32B 2307/736* (2013.01); *B32B 2307/738* (2013.01); *B32B 2307/75* (2013.01); *B32B 2435/00* (2013.01); *B32B 2439/00* (2013.01); *B32B 2439/06* (2013.01); *B32B 2439/46* (2013.01); *B32B 2439/60* (2013.01); *B32B 2439/70* (2013.01)

(58) Field of Classification Search
CPC ........ B32B 2307/736; B32B 2307/738; B32B 2307/75; B32B 2435/00; B32B 2439/00; B32B 2439/06; B32B 2439/46; B32B 2439/60; B32B 2439/70; B32B 27/08; B32B 27/16; B32B 27/18; B32B 27/22; B32B 27/302; B32B 27/304; B32B 27/306; B32B 27/308; B32B 27/32; B32B 27/325; B32B 27/327; B32B 27/34; B32B 27/36; B32B 7/12
See application file for complete search history.

(56) References Cited

U.S. PATENT DOCUMENTS

| | | |
|---|---|---|
| 3,278,663 A | 10/1966 | Graham |
| 3,302,241 A | 2/1967 | Lemmer et al. |
| 3,456,044 A | 7/1969 | Pahlke |
| 3,554,604 A | 1/1971 | Sugden |
| 3,567,539 A | 3/1971 | Schirmer |
| 4,044,187 A | 8/1977 | Kremkau |
| 4,104,404 A | 8/1978 | Bieler et al. |
| 4,188,350 A | 2/1980 | Vicik et al. |
| 4,196,240 A | 4/1980 | Lustig et al. |
| 4,207,363 A | 6/1980 | Lustig et al. |
| 4,457,960 A | 7/1984 | Newsome |
| 4,578,294 A | 3/1986 | Ouchi et al. |
| 4,883,693 A | 11/1989 | Ohya et al. |
| 5,079,051 A | 1/1992 | Garland et al. |
| 5,336,549 A | 8/1994 | Nishimoto et al. |
| 6,146,726 A | 11/2000 | Yoshii et al. |
| 6,159,616 A | 12/2000 | Planeta et al. |
| 6,218,024 B1 | 4/2001 | Tamber et al. |
| 6,406,763 B1 | 6/2002 | Wolf et al. |
| 6,562,443 B1 | 5/2003 | Espinel et al. |
| 6,565,985 B2 | 5/2003 | Ueyama et al. |
| 6,610,392 B1 | 8/2003 | Ramesh et al. |
| 6,699,549 B1 | 3/2004 | Ueyama et al. |
| 7,200,977 B2 | 4/2007 | Ramesh et al. |
| 7,207,157 B2 | 4/2007 | Wolf et al. |
| 7,687,123 B2 | 3/2010 | Broadus et al. |
| 7,744,803 B2 | 6/2010 | Broadus et al. |
| 7,993,713 B2 | 8/2011 | Ishii et al. |
| 8,202,590 B2 | 6/2012 | Lee et al. |
| 2005/0136202 A1* | 6/2005 | Kendig .................. B32B 27/36 428/35.7 |
| 2009/0208718 A1* | 8/2009 | Stoll ....................... B32B 27/36 428/220 |
| 2010/0003432 A1 | 1/2010 | Schiffman |
| 2012/0052270 A1* | 3/2012 | Pittelli ................. B32B 27/302 428/213 |

* cited by examiner

MULTILAYER BARRIER FILM

FIELD OF INVENTION

The present application generally relates to the field of multilayer plastic films or sheets, and in particular, relates to multilayer plastic films or sheets comprising improved properties, such as improved barrier or mechanical properties.

BACKGROUND OF THE INVENTION

Multilayer bi-axially oriented high shrink plastic barrier films are used for many purposes, such as for food packaging, where barrier properties to moisture, gases and aroma, and/or mechanical properties (e.g. puncture resistance, tear and tensile strength) are required. Multilayer bi-axially oriented low shrink plastic barrier films are used as stand alone webs for VFFS or HFFS applications, as lidding film for thermoformed containers or may be laminated for conversion to pouches or bags.

A number of bi-axially oriented barrier shrink films and heat stabilized films have been described; however, these films have drawbacks. For example, U.S. Pat. No. 4,883,693 teaches a co-extruded bi-axially stretched and laminated heat shrinkable tubular film that contains two layers of polyolefin, a layer of vinylidiene chloride (VdC) copolymer as a gas barrier, and an intermediate layer of polyamide or thermoplastic polyester (both of which exhibit a crystal melting point of not more than 240° C.). A typical structure from the outer layer to the inner layer is: polyolefin/adhesive/VdC layer/adhesive/polyamide or thermoplastic resin layer/adhesive layer/polyolefin layer. A preferred embodiment is indicated to be a laminate film having either two polyamide or thermoplastic polyester layers.

U.S. Pat. No. 5,079,051 teaches a high shrink energy/high modulus thermoplastic multilayer film consisting of poly(ethylene terephthalate)-glycol (PETG), polyvinylidene chloride (PVDC), ethylene-vinyl acetate (EVA), polyolefin and adhesive materials.

U.S. Pat. No. 5,336,549 describes bi-axially oriented heat shrinkable film consisting of a surface layer of polyester, a core layer of polyamide and a heat-sealing layer of polyolefin.

U.S. Pat. Nos. 6,146,726 and 6,342,282 teach a film consisting of an outer layer (A) of thermoplastic or polyester resin, a gas barrier core layer (B), a sealing innermost layer (C) and an intermediate layer (D1) of polyamide, thermoplastic polyester or ethylene copolymer resins.

U.S. Pat. No. 6,406,763 describes a multilayer, heat shrinkable food packaging film in one embodiment which is composed of the following layers: polyester/tie/EVA/tie/ethylene vinyl alcohol (EVOH)/tie/shrink and abuse layer/sealing layer.

U.S. Pat. No. 6,562,443 teaches a heat shrinkable film comprising skin layers, appropriate tie layers and a core of Nylon 6 (4.2 microns)/EVOH (4.2 microns)/Nylon 6 (5 microns) in a film which is about 65 microns thick.

European patent no 1062093 B1 describes a multilayer heat shrinkable film comprising a first layer of polyolefin, a second layer selected from the group of polyolefin, polystyrene and polyurethane, a third layer comprising at least one member selected from a group consisting of amorphous polyester and polyester, a fourth outer layer comprising one member selected from a group of polyester, polyamide and polyurethane, a fifth layer (between the third and fourth layers) comprising EVOH and a sixth layer comprising at least one member from the group of amorphous polyester and polyester.

U.S. Pat. No. 7,207,157 describes a multilayer heat shrinkable film comprising a first layer of polyolefin, a second layer comprising polyolefin, polystyrene and polyurethane, a third polyamide layer(s), and a fourth polyester layer.

U.S. Pat. No. 6,610,392 describes a multilayer heat shrinkable film comprising a first layer of polyolefin, a second layer comprising one member selected from the group of polyolefin and polystyrene, a third layer comprising at least one member selected from the group consisting of amorphous polyester and polyester, and a fourth layer consisting of one member selected from the group of polyester, polyamide and polyurethane. The first layer is a heat sealable layer and the fourth layer is an outer layer.

U.S. Pat. No. 7,200,977 describes a multilayer heat shrinkable film comprising an outer layer of polyolefin, a second layer comprising one member selected from the group of polyolefin and polystyrene, a third layer comprising at least one member selected from the group containing amorphous polyester and polyester, and a fourth layer (outer layer) comprising one member from the group consisting of polyester, polyamide and polyurethane.

U.S. Pat. No. 6,565,985 describes a polyamide-based heat shrinkable multilayer film consisting of three components, a surface layer of polyester, an intermediate layer of polyester and an inner sealing layer. The multilayer film has hot water shrink ability at 80° C. of at least 30% in both directions (MD/TD).

U.S. Pat. No. 6,699,549 describes bi-axially oriented heat shrinkable film consisting of a surface layer of polyester, an intermediate layer of polyester and an inner sealing layer. The multilayer film has hot water shrink ability at 90° C. of at least 20%.

U.S. Pat. No. 7,993,713 describes a heat shrinkable multilayer film comprising an outer layer of polyolefin or polyester, a first intermediate layer of polyamide, a second intermediate layer of EVOH, a third intermediate layer of polyamide and an inner sealing layer. The multilayer film has hot water shrink-ability at 90° C. within a range of 3% to 45%.

U.S. Pat. No. 8,202,590 teaches a heat shrinkable biaxially oriented multilayer film comprising an outside layer of polyester resin or other thermoplastic resins, an adhesive layer, an EVOH barrier layer, an adhesive layer and a sealant layer.

US patent application no. US2010/0003432 describes a multilayer, flat or tube-like plastic food casing which is bi-axially oriented and composed of nine layers, including an outside layer containing poly(ethylene terephthalate) (PET), second, fourth and eighth adhesive layers; third and ninth polyolefin layers; fifth and seventh polyamide layers and a sixth layer containing EVOH.

Most of the above-described films have an EVOH or polyamide (PA) core barrier layer for oxygen, but both of these materials are hydrophilic which means as the relative humidity level on skin surfaces of the film increases, these materials absorb moisture and their oxygen barrier properties decline, specifically for EVOH. While some of the films include layers surrounding the core barrier, e.g. an outer PET layer and/or an adjacent adhesive layer, these have very low moisture barrier properties, and thus, the core layers of EVOH or PA can be exposed to high relative humidity (RH) leading to deterioration of oxygen transmission rate (OTR) in the films. This is generally problematic as the outside layer of the film is exposed to water during processing at three stages: during cooling of the primary tape, when the primary tape is heated in a hot water bath and during stress relaxation of third bubble using steam (the most critical for moisture absorption).

Further, in order to maintain low RH % exposure to a core barrier such as EVOH (and/or PA), the barrier layer may be protected by various hydrophobic materials such as polypropylene (PP), polyethylene (PE), cyclic olefin copolymers (COC), polystyrene (PS), PETG or many other thermoplastic materials. Different thicknesses of each of these materials may be used in the inside layer of the film or on an outside layer of the film (EVOH being sandwiched as the core or middle). The aim is to reduce the RH % exposure to EVOH (in order to maintain its high OTR); however, these types of polyolefin materials only provide minimal moisture protection.

Films in which an EVOH barrier is protected on one side by a blend of COC and PE, and having a sealant layer on the other side, have also been made. However, there are drawbacks with this structure too, such as, if the sealant layer gets contaminated with a food product wrapped in the film, e.g. meat or cheese, it may affect the moisture barrier properties of the sealant layer. As well, the trend of the bi-axial film is down-gauging, which means the thickness of the film (based on end applications) is being reduced from 40 microns to 30 microns to 25 microns to 22 microns, and the sealant layer thickness will be reduced, causing a higher chance of moisture exposure to the EVOH layer.

PVDC-based core film structures have also been described, for example as in U.S. Pat. No. 4,883,693, in which the PVDC barrier layer of vinylidene chloride has a thickness of not less than 6 microns, which is not more than 30% of the total thickness of the co-extruded bi-axially stretched film. The PVDC copolymer comprised a vinylidene chloride (VdC) content of 65% to 95% by weight. This limits the barrier properties of the film, including oxygen, aroma and moisture barrier properties.

U.S. Pat. Nos. 6,159,616 and 6,218,024 described films which attempt to resolve some of the above-mentioned issues. For example, U.S. Pat. No. 6,159,616 describes a film having two PVDC barrier layers and the PVDC copolymer contains a VdC content of up to 98%. Similarly, U.S. Pat. No. 6,218,024 teaches a film in which an EVOH barrier is protected with two layers of high barrier PVDC (making it a symmetrical structure). PVDC provides improved moisture barrier properties as compared to PE, PP, high density (HD) PE, medium density (MD) PE, low density (LD) PE, polycarbonate (PC), polymethyl-methacrylate (PMMA), PS, ethylene vinyl acetate (EVA), ethylene methacrylate (EMA) and linear low density (LLD) PE. However, both of these patents describe the use of PE as an outer skin layer. Thus, the bi-axial film cannot be used for stand-alone applications in which the outer skin layer requires heat resistance.

Thus, it would be desirable to provide an improved multi-layer film that overcomes at least one of the disadvantages of existing films.

SUMMARY OF THE INVENTION

In one aspect of the present invention, a multilayer plastic film or sheet having a series of component layers and optional bonding layers tying said component layers together is provided. The multilayer film or sheet comprises a central barrier layer comprising first and second layers of polyvinylidene chloride (PVDC) polymer bonded together with a tie or bonding layer, an outer layer adjacent to an outer side of the first PVDC layer, and a sealant layer adjacent to an outer side of the second PVDC layer.

This and other aspects of the invention are described by reference to the detailed description that follows and the drawings.

DETAILED DESCRIPTION OF THE INVENTION

Figure 1:
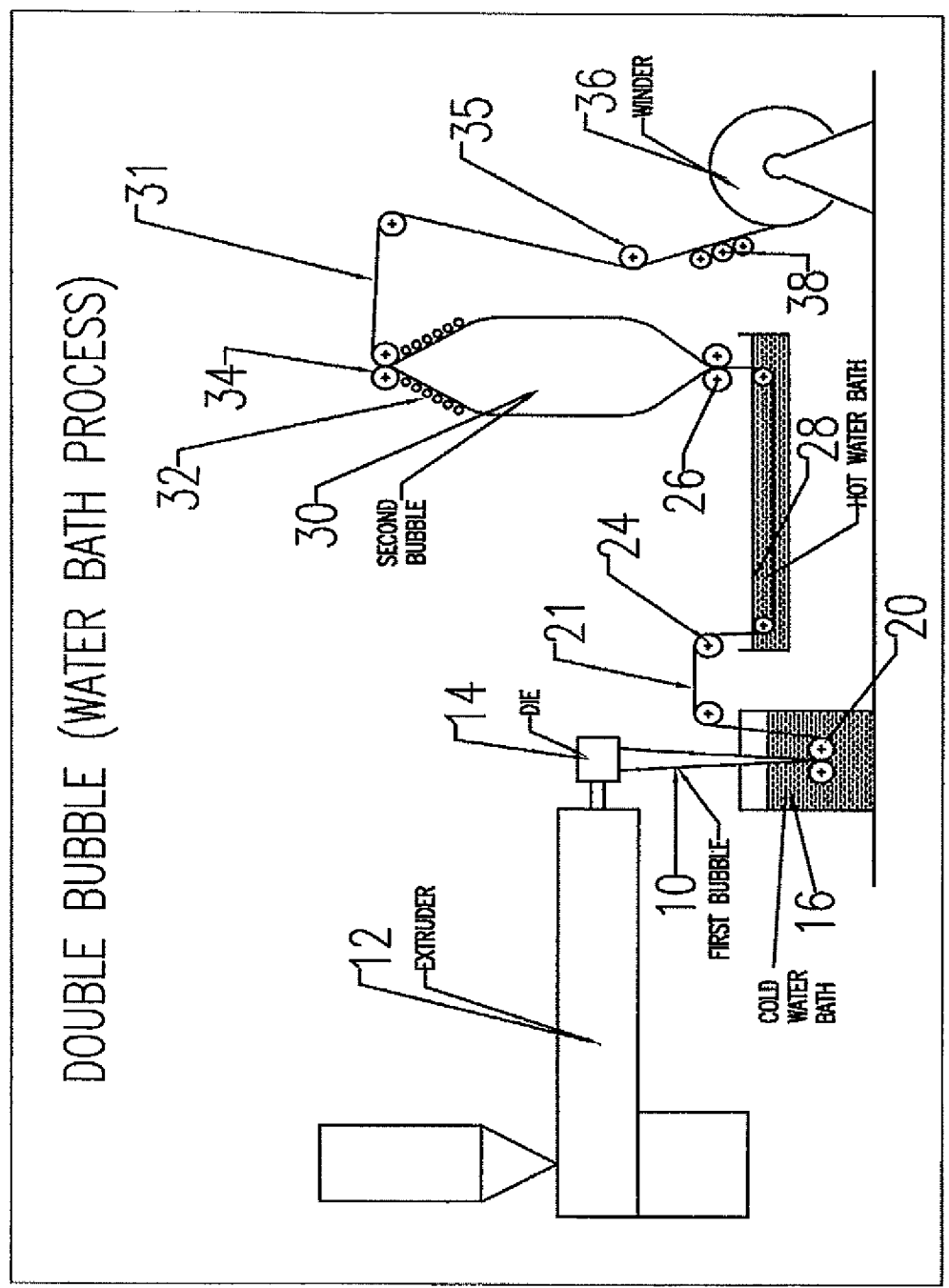
FIG. 1 is a schematic drawing showing the production of biaxially oriented heat shrinkable multilayer plastic film in accordance with one embodiment of the invention by means of a double bubble blown process using water as reheating system for primary tube and hot rolls as annealing system.
Figure 2:
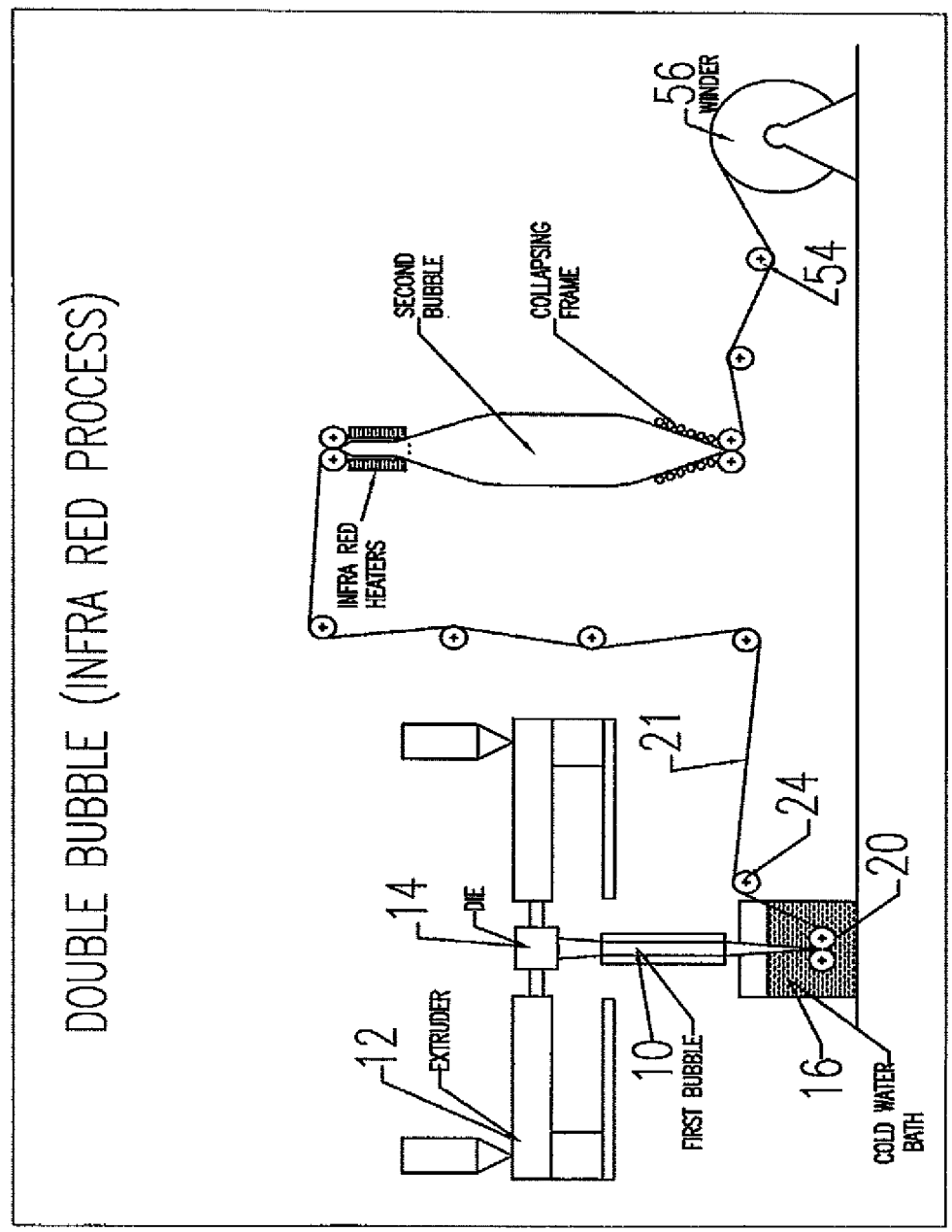
FIG. 2 is a schematic drawing showing the production of biaxially oriented heat shrinkable multilayer plastic film in accordance with one embodiment of the invention by means of a double bubble blown process using Infrared as reheating system for primary tube and hot rolls as annealing system.
Figure 3:
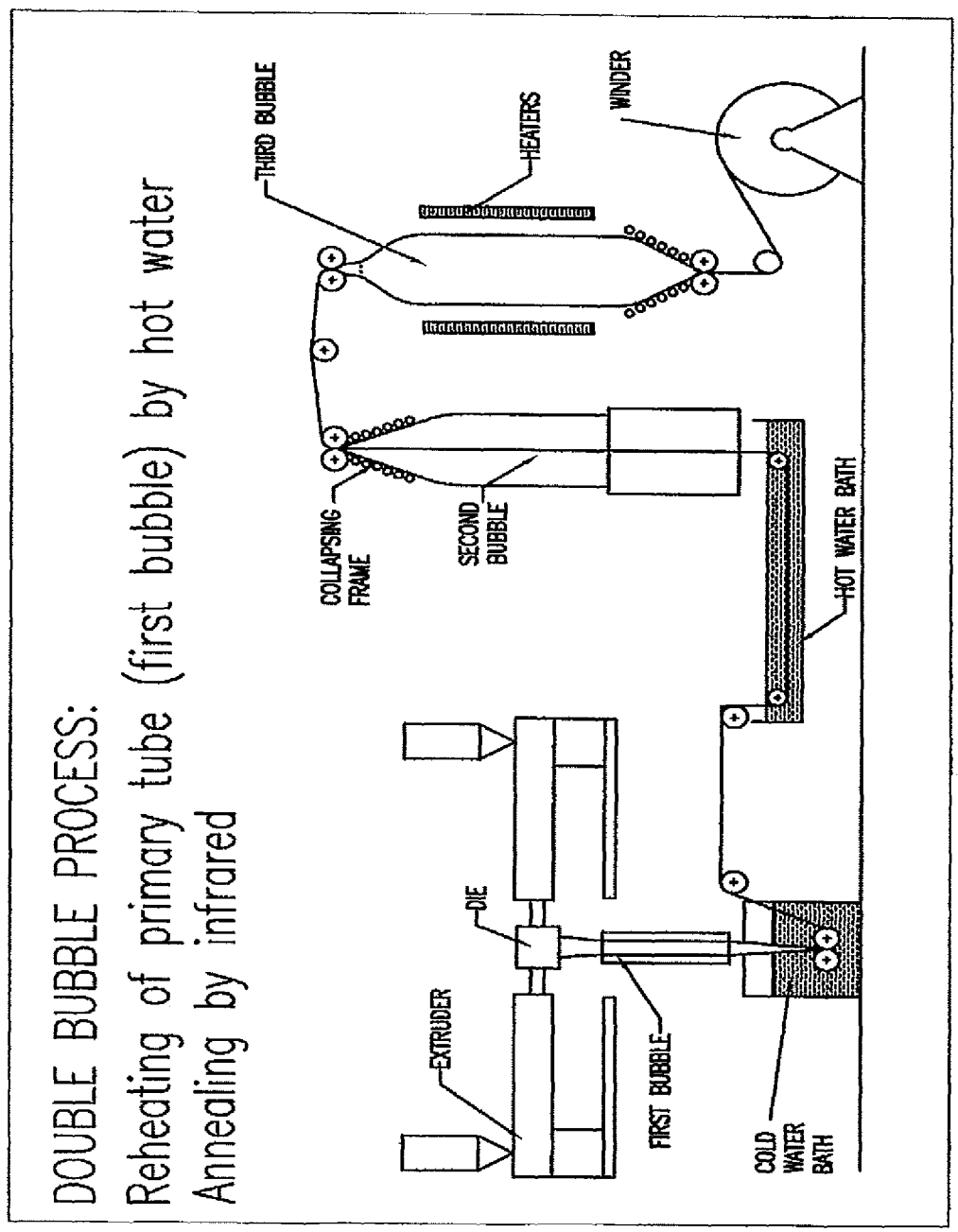
FIG. 3 is a schematic drawing showing the production of biaxially oriented heat shrinkable multilayer plastic film in accordance with one embodiment of the invention by means of a double bubble blown process using water as reheating system for primary tube and Infrared as annealing system for third bubble.

A novel multilayer film or sheet comprises a central barrier layer comprising at least first and second layers of polyvinylidene chloride (PVDC) polymer bonded together with a tie or bonding layer, an outer layer adjacent to an outer side of the first PVDC layer, and a sealant layer adjacent to an outer side of the second PVDC layer.

In one embodiment, the polyvinylidene chloride polymer of the central barrier layer, e.g. first and second PVDC layers, and optionally, 3 or more PVDC layers, may comprise from 85% to about 98% by weight of vinylidene chloride, and 15 to 20% by weight of at least one unsaturated monomer copolymerizable with vinylidene chloride, such as methyl acrylate (MA) or vinyl chloride to form, for example, vinylidene chloride-methyl acrylate copolymer, vinylidene chloride-vinyl chloride copolymer, or vinylidene chloride-acrylic acid copolymer. The amount of co-monomer combined with vinylidene chloride is an amount which renders the PVDC processible, while not lowering the barrier properties of the PVDC to an undesirable level, e.g. an amount in the range of about 2% of MA in PVDC-MA copolymer provide OTR 0.05 g to 0.07 g cc-mil/100 in$^2$. The PVDC layers may contain additives such as heat stabilizers and plasticizing compounds such as epoxidized soya bean oil and stearamide as known in the art. Each PVDC layer has a thickness in the range of from about 1 to 25 microns, more preferably 1.5 microns to 15 microns and more preferably from 2 to 10 microns.

The central barrier may include additional polymer components. In one embodiment, the central barrier layer additionally includes an EVOH barrier layer. The EVOH layer comprises hydrolyzed ethylene-vinyl acetate copolymer, e.g. exhibiting saponification of up to or greater than 98%, with an ethylene content from about 25 to 48 mole percent and a melt index (MI) of from about 0.5 MI to 10 MI, preferably from about 1.6 MI to 6 MI. In another embodiment, the central barrier may include one or more polyamide layers such as a copolymer or terpolymer polyamides with solution viscosity 3.0 to 4.5 in 96% sulfuric acid and a melting point of below 195° C., for example, nylon blends such as a blend of nylon-666 with nylon-6,12; nylon terpolymer, PA11, PA12 or plasticized nylon. The polyamides may be blended with polyvinyl acetate (PVA), or may be included with an EVOH layer. The thickness of the EVOH layer in this embodiment is in the range of about 1 to 20 microns, preferably 1-3 microns, and the thickness of each additional polyamide layer is from about 1 to 15 microns, preferably about 1 to 10 microns.

The PVDC layers of the central barrier layer are bonded together with a bonding or tie layer. The PVDC layers may be directly bonded together with a tie layer, or may be indirectly bonded together with tie layers to a central EVOH layer or to optional polyamide layers that may be present and may encapsulate an EVOH layer, if incorporated in the central barrier layer. Suitable polymers for inclusion in the tie layer include polymers, for example, having a melt index of from about 0.5 MI to 6 MI. Examples of such polymers include, but are not limited to, ethylene vinyl acetate, ethylene methyl-acrylate, ethylene-acrylic acid copolymer, maleic anhydride-modified polyethylene such as linear low density polyethylene (LLDPE) and low density polyethylene (LDPE); maleic anhydride-modified EVA or EMA; or acid copolymer. The bonding polymer may also be blended with PP, HDPE, COC or LLDPE. For example, the bonding layer may comprise ethylene-vinyl acetate copolymer with a melt index about 0.1 to about 6.0 decigram per minute and a vinyl acetate content of from 9 to about 28 percent by weight. The polymers in the tie layers may be partially cross-linked prior to inclusion in the film. Each tie layer may have a thickness in the range of from about 1 to about 10 microns. It is noted that other layers of the present multilayer film may additionally be tied or bonded together with bonding or tie layers, for example, a tie layer may bond the outer layer to the first PVDC layer or to a bulk layer, the bulk layer to the first PVDC layer, the second PVDC layer to the sealant layer or a shrink layer, and the shrink layer to the sealant layer.

The thickness of the central barrier layer may be in the range of from about 3 microns to 200 microns, more preferably 5 microns to 50 microns and more preferably from 5 to 20 microns.

The multilayer film comprises an outer layer adjacent to the outer side of the first PVDC layer of the core barrier layer. The outer layer will generally comprise a heat resistant polymer having a melting point in the range of 190° C. to 265° C. Examples of suitable polymers include, but are not limited to, polychlorotrifluoroethene (PCTFE), polyvinylidene fluoride (PVDF) copolymer, a thermoplastic polymer such as a polyester, e.g. polyethylene terephthalate (PET), e.g. PET with a melting point of above 250° C., polyethylene terephthalate glycol-modified (PETG), high density polyethylene (HDPE), PETG/PET, polyolefin (PO), polypropylene (PP), amorphous polyethylene terpthalate (APET), polyethylene naphthalate (PEN), polybutylene terephthalate (PBT), PLA (polylactic acid), COC, polyolefin, blends of COC with PE or PP (homopolymer or copolymer), copolymers of VDF (vinylidene fluoride) with hydrofluoroethene (HFE), nylons (polyamide polymers) such as nylon-6 having a melting point of about 220° C.; nylon 6,10; nylon 6,12; nylon terpolymer; nylon 11; nylon 12; nylon 6,9; nylon 4,6; aromatic nylon (MDX6); amorphous nylon; and nylon blends such as a blend of nylon-6 with nylon-6,6, or a blend of nylon-6 with nylon-6,12 or nylon 6/66 (PA666) copolymer with a melting point of about 190° C. to about 195° C. The total thickness of the outer layer is in the range of from about 1.5 to about 20 microns, and preferably from about 2 to about 11 microns. The outer layer may be bonded to the first PVDC layer of the central barrier layer with a tie layer as above described.

The multilayer film may optionally include a bulk layer in between the outer layer and the first PVDC layer of the central barrier layer. The bulk layer, if present, comprises one or more polyolefins having a density in the range of about 0.88 g/cc to 1.04 g/cc, and a melt index (MI) of from about 0.5 MI to 10 MI, preferably from about 1.0 MI to 6 MI. Examples of suitable polymers for inclusion in the bulk layer include elastomers, plastomers, polypropylene homopolymer, copolymer, or terpolymer, styrene-based copolymers, polystyrene, styrene block copolymer (SBC), low density polyethylene (LDPE), cyclic olefin copolymer (COC), acid polymers, high density polyethylene (HDPE), linear low density polyethylene (LLDPE), metallocene LLDPE (mLLDPE), very low density polyethylene (VLDPE), metallocene polyethylene (mPE), high density polyethylene (HDPE), single site metallocene catalyst (SSC)-based LLDPE, ethylene-vinyl acetate (EVA), ethylene methacrylate (EMA), octene-LL, hexene-LL, butene-LL, ionomers, and blends of any of these polymers. For example, the bulk layer may comprise 2 polymers such as LLDPE/EVA or LLDPE/elastomer. As one of skill in the art will appreciate, the polymers of the bulk layer may be partially cross-linked in a manner well-established in the art prior to processing (to improve shrink properties). The polymers of the bulk layer may also be partially irradiated polymers. The bulk layer has a thickness in the range of about 10 to 50 microns, preferably between 15 to 25 microns, and more preferably from 2 to 5 microns. The bulk layer may be bonded to the outer layer and/or the first PVDC layer with a tie layer.

The present multilayer film also comprises a sealant layer bonded to the outer side of the second PVDC layer, optionally via a tie layer. The sealant layer is the interior layer of the multi-layer film, i.e. the layer that is adjacent to the product being packaged or enrobed by the multi-layer film. The sealant layer comprises one or more polyolefins sufficient to provide a seal, e.g. having a seal strength from about 2 to 20 lbs/inch and a density of 0.88 g/cc to 0.920 g/cc. Examples of suitable polymers for inclusion in the sealant layer include elastomers, plastomers, polyethylene (PE), polyolefin (PO), polypropylene homopolymer, copolymer, or terpolymer; or a blend of low density polyethylene (LDPE), medium density polyethylene (MDPE), linear low density polyethylene (LLDPE), metallocene LLDPE (mLLDPE), very low density polyethylene (VLDPE), metallocene polyethylene (mPE), high density polyethylene (HDPE), single site metallocene catalyst (SSC)-based LLDPE, ultra low density PE (ULDPE), ethylene-vinyl acetate (EVA), ethylene methacrylate (EMA), ethylene acrylic acid (EAA), ethylene methacrylic acid, ethylene methyl acrylate copolymer (EMAC), salts of ethylene acrylic acid or methacrylic acid, acid co-polymers, and ionomers, the blend having with a melt index (MI) of from about 0.5 MI to 10 MI, preferably from about 1.6 MI to 6 MI. In one embodiment, the sealant layer may comprise linear low density polyethylene with a melt index of from about 0.5 to about 6.0 decigram per minute. The polymers utilized in the sealant layer may be partially cross-linked prior to processing. The sealant layer may have a thickness in the range of about 10 to 50 microns, preferably a thickness of between 15 to 25 microns.

The multilayer film may optionally include a shrink layer in between the sealant layer and the second PVDC layer of the central barrier layer, optionally bonded to one or both of these layers with a tie layer. The shrink layer comprises one or more polyolefins having a density of 0.88 g/cc to 0.92 g/cc, and which exhibit at least about 10% to 50% shrinkage at 90° C. Examples of suitable polymers include elastomers, plastomers, polypropylene copolymer, or terpolymer; or a blend of low density polyethylene (LDPE), linear low density polyethylene (LLDPE), metallocene LLDPE (mLLDPE), very low density polyethylene (VLDPE), ultra low density polyethylene (ULDPE), metallocene polyethylene (mPE), single site metallocene catalyst (SSC)-based LLDPE, ethylene-vinyl acetate (EVA), ethylene methacrylate (EMA), acid polymers, network polymers, ionomers with a melt index (MI) of from about 0.5 MI to 10 MI, preferably from about 1.0 MI to 6 MI, e.g. a blend of LLDPE/EVA or a blend of LLDPE/elastomer). To improve shrink characteristics, the polymers utilized in the shrink layer may be partially cross-linked prior to processing. Polymers in the shrink layer may be partially irradiated. The shrink layer may have a thickness in the range of about 2 to 50 microns, preferably a thickness between 2 to 25 microns, and more preferably a thickness from 2 to 16 microns.

The present multi-layer film has a total thickness of from about 10 to about 250 microns, preferably a thickness of from about 20 to about 160 microns, and more preferably, a thickness of from about 25-120 microns. The films may have from 7 to 15 layers. The multi-layer film may exhibit shrinkage from about 5% to 40% at 90° C.

The present multi-layer film advantageously provides a film which is desirably reduced in thickness from prior films, but which retains high barrier properties, e.g. moisture and oxygen barrier properties, high heat resistance and mechanical properties with minimal flex cracking.

Examples of multilayer films in accordance with embodiments of the present invention include, but are not limited to, the following:

PETG/tie/PVDC/EVA/PVDC/tie/Sealant (7-layer)
PETG/tie/PE-bulk/tie/PVDC/EVA/PVDC/tie/Sealant (9-layer)
PETG/tie/PVDC/EVA/PVDC/tie/PE shrink layer/Sealant (9-layer)
PETG/tie/PE-bulk/tie/PVDC/PVDC/tie/PE-shrink/Sealant (10-layer)
PA/tie/PE-bulk/tie/PVDC/EVA/PVDC/tie/Sealant (9-layer)
PVdF/tie/PE-bulk layer/tie/PVDC/EVA/PVDC/tie/Sealant (9-layer)
COC+PE/tie/PE-bulk/tie/PVDC/EVA/PVDC/tie/Sealant (9-layer)
PP/tie/PE-bulk/tie/PVDC/EVA/PVDC/tie/Sealant (9-layer)
PETG/tie/PVDC/tie/Nylon/tie/PVDC/tie/Sealant (9-layer)
PETG/tie/PVDC+tie/EVOH/tie+PVDC/tie/Sealant (7-layer)
PETG/tie/PVDC/tie/Nylon+PVA/tie/PVDC/tie/Sealant (9-layer)
PETG/tie/PVDC/tie/PA/EVOH/PA/tie/PVDC/tie/Sealant (11-layer)
PA/tie/PVDC/tie/PA/EVOH/PA/tie/PVDC/tie/Sealant (11-layer)
PVdF/tie/PVDC/tie/PA/EVOH/PA/tie/PVDC/tie/Sealant (11-layer)
PETG/tie/PE-bulk/tie/PVDC/tie/PA/EVOH/PA/tie/PVDC/tie/Sealant (13-layer)
PETG/tie/PE-bulk/ieVDC/tie/PA/EVOH/PAtie/PVDC/tie/PE-shrink/Sealant (14-layer)
PETG/tie/PVDC/Tie Encapsulating EVOH/PVDC/tie/Sealant (7-layer)
PETG/tie/PVDC/tie/PA Encapsulating EVOH/tie/PVDC/tie/Sealant (11-layer)
PA/tie/PVDC/tie/PA Encapsulating EVOH/tie/PVDC/tie/Sealant (11-layer)
PETG/tie/PE/EVA/PVDC/tie/Nylon/EVOH/Nylon/tie/PVDC/tie/PE/Sealant (13 layers).
PETG/tie/COC+PE/PE/EVA/PVDC/tie/Nylon/EVOH/Nylon/tie/PVDC/tie/COC+PE/PE/Sealant (15 layers).

A multi-layer film in accordance with the present invention may be made using various established methods. These methods include the use of an annular co-extrusion die as in double bubble, double bubble with third bubble for annealing and blown processes (air cooled and water cooled), and the use of flat co-extrusion dies as in a cast process, sheet process, extrusion coating process, lamination and extrusion coating lamination. Examples of suitable processes are illustrated in FIGS. 1-4. The multi-layer film produced can be laminated on different surfaces (e.g. with biaxially-oriented polyethylene terephthalate (BOPET), biaxially-oriented PP (BOPP), biaxially-oriented PA (BOPA) films or PVC, PP or amorphous PET (APET) sheets) by solvent, solvent-less and water-based lamination processes to convert the multi-layer film into bags, pouches, lidding, thermoformed products or stand-alone webs. The multilayer film may also be used to produce containers, bottles, and the like by extrusion blow molding or injection stretch blow molding processes.

The present multi-layer film may also be made by multilayer extrusion into a tubular bubble form, cooled and collapsed to form a sheet. The subsequently collapsed film may be returned to a second tubular bubble form, stretched radially and longitudinally to produce a bi-axially oriented heat shrinkable film, and may be collapsed again to a further sheet form. The further sheet form may be partially cross-linked by exposure to high energy electrical radiation to improve the mechanical properties of the film or sheet.

Embodiments of the invention are described in the following specific examples which are not to be construed as limiting.

Example 1—Double Bubble Process for Making Multilayer Film

In one embodiment of the invention, a multilayer film of 9 layers with excellent moisture, oxygen barrier and mechanical properties has been fabricated. The structure of the multilayer film was: PETG/tie/PE-bulk/tie/PVDC/EVA/PVDC/tie/sealant layer. The outer layer of this film is heat resistant and provides high gloss and printability.

The outer layer of the film was PETG, density 1.33 g/cc, intrinsic viscosity 0.79 dl/g, melting point 225° C., and thickness of 2 microns. The bonding tie layer was an ethylene-based copolymer, melt index 2.7, density 0.90 g/cc. The bulk layer was VLDPE, with a density of 0.912 and melt index of 1.0. The core oxygen and moisture barrier layer of PVDC (VdC content—98%), MA-based copolymer, each PVDC layer was 2.5 microns, while the EVA (2 MI, VA 28%) layer (sandwiched between two PVDC layers) was 3 microns. The tie layer was an ethylene-based copolymer. The sealant layer was a blend of ULDPE (density 0.905, melt index 0.8) and plastomer (density 0.902 and melt index 1.0).

The double bubble line was started with 2 MI LDPE in all extruders, with later barrel profile changed slightly (as per resin supplier specification for each resin) and each layer was changed one by one until all desired materials and layer ratios were obtained. The primary speed was from 4.5 meter/min, and the tube thickness was 900 microns. The tube was heated in a hot water bath (85° C.) and oriented in MD and TD direction and secondary nip was at 20 m/min to make a final film of 65 microns.

The bi-axially oriented heat shrinkable multilayer film was produced by the known double bubble method. Referring to FIG. 1, a tubular nine layer film was produced by using nine extruders 12 (only one is shown). The polymers extruded by extruders 12 were fed to an annular die 14, and tubular primary tube of nine layers extruded downwardly therefrom. The tubular nine layer primary tube was cooled in a cold water tank 16 located under the die 14 and containing water at a temperature of about 25° C. or lower. The bubble 10 formed by a multilayer primary tube was squeezed by nip roll 20 in the cold water tank 16 which collapsed the primary tube from bubble form to sheet form. The cold water in the tank 16 quenched the tubular primary tube to maintain the amorphous state of the plastic material and to lower the temperature thereof so that substantially no crystalline growth occurred in the polymer tube which would inhibit the subsequent process of orientation.

The collapsed primary tube 21 from the cold water tank 16 was passed over idler rolls 24 and through a pair of nip rolls 26. The collapsed film 21 was then passed from the nip rolls 26 through a water heating section 28 and blown to form a second bubble 30, which was subsequently collapsed by a collapsing frame 32. The collapsed film 31 was then passed through a pair of nip rolls 34, which were rotated at three to five times faster than nip roll 26, with the air in the bubble 30 being entrapped therein by the rolls 26, 34. This resulted in biaxial orientation of the film lengthwise (MD) and breadthwise (TD). The collapsed film 31 was then passed over further idler rolls 34 and then film is passed through an annealing station (60° C.) 38 which stabilized the film to prevent shrinkage and then film was wound in the form of a roll 36. The bi-axially oriented, heat shrinkable film may be slit (if desired trim can be removed) and wind as two separate rolls.

The bi-axially oriented film produced had a thickness of 55 microns and exhibited good mechanical and barrier properties, e.g. the film was flexed over 100 times with no visible mechanical cracking. The film exhibited a shrinkage of 25% to 30% in MD and TD direction at 90° C.

Example 2—Double Bubble Process for Making Multilayer Film

In another embodiment of the invention, a multilayer film (10 layers) with excellent moisture, oxygen barrier and mechanical properties was fabricated. The structure of the multilayer film was: PA666/tie/PE-bulk/tie/PVDC/EVA/PVDC/tie/PE-shrink/sealant layer). The first outer layer was PA666, melting point 195° C., density 1.2 g/cc, thickness 5 microns. The bonding tie layer was an ethylene-based copolymer, having a melt index of 2.7 and density of 0.90 g/cc. The bulk layer was VLDPE, with a density of 0.912 and melt index of 1.0. The core oxygen and moisture barrier layer of PVDC (VdC content—98%), MA-based copolymer, and EVA, 2 MI, VA 25-28%. Each PVDC layer was 2 microns, while the EVA layer was 2.5 microns. The tie layer was an ethylene-based copolymer. The shrink layer was a plastomer of density 0.900, melt index 1.0. The sealant layer was a blend of ULDPE (density 0.905, melt index 0.8) and plastomer (density 0.902 and melt index 1.0).

The biaxially oriented heat shrinkable multilayer film was produced by the double bubble method, illustrated in FIG. 1. The tubular ten layer film was produced by using ten extruders as described in Example 1. The polymers were extruded by extruders 12 (only 1 extruder is shown) were fed to an annular die 14, and tubular primary tube of ten layers extruded downwardly therefrom. The tubular ten layer primary tube was cooled in a cold water tank 16 located under the die 14 and containing water at a temperature of about 25° C. or lower. The bubble 10 formed by a multilayer primary tube was squeezed by nip roll 20 in the cold water tank 16 which collapsed the primary tube from bubble form to sheet form. The cold water in the tank 16 quenched the tubular primary tube to maintain the amorphous state of the plastic material and to lower the temperature thereof so that substantially no crystalline growth could occur in the polymer tube which would inhibit the subsequent process of orientation.

The collapsed primary tube 21 from the cold water tank 16 was passed over idler rolls 24 and through a pair of nip rolls 26 (at a speed depending upon thickness of primary tube, lay flat and material, for example, primary nip can be rotated 2 m/min to 90 m/min). The collapsed film 21 was then passed from the nip rolls 26 through a water heating section 28 and blown to form a second bubble 30, which was subsequently collapsed by a collapsing frame 32. The collapsed film 31 was then passed through a pair of nip rolls 34, which were rotated at three to five times faster than nip rolls 26, with the air in the bubble 30 being entrapped therein by the rolls 26, 34. This resulted in biaxial orientation of the film lengthwise (MD) and breadthwise (TD). The collapsed film 31 was then passed over idler rolls 34 and the film was then passed by an annealing station 38 (annealing temperature depends upon polymer material fabricating the film, and could be from 50° C. to 140° C.) to stabilize the film and to prevent shrinkage from the rolls 36, in present scenario annealing temperature was 70° C. The bi-axially oriented, heat shrinkable film may be slit (if desired trim can be removed) and wind as two separate rolls.

The resulting bi-axially oriented heat shrinkable film had a physical thickness of 40 microns. The film exhibited excellent oxygen, moisture and mechanical properties. The film was flexed 100 times without any visible mechanical cracks appearing. The film was tested for shrinkage and showed an excellent shrinkage of 30% in TD and 30% in MD at 90° C.

Example 3: Double Bubble Process with Annealing for Making Multilayer Film

In another embodiment, a multilayer film (11 layers) with excellent moisture, oxygen barrier and mechanical properties was fabricated having the following structure: PETG/tie/PE/tie/PVDC/tie/EVOH/tie/PVDC/tie/sealant layer. The first outer layer was PETG, density 1.33 g/cc, intrinsic viscosity 0.79 dug, melting point 225° C., thickness 2 microns. The bonding tie layer was an ethylene-based copolymer, melt index 2.7, density 0.90 g/cc. The bulk layer was LLDPE, density 0.916, melt index 1.0, thickness 10 microns. The barrier layer included two PVDC layers for oxygen and moisture barrier (VdC content—98%), MA-based copolymer, thickness of each PVDC layer was 2.5 microns, and central layer of EVOH (ethylene 38 mole %), density 1.17 g/cc, thickness 1.5 microns. The tie layers were ethylene-based copolymer, thickness 1.5 microns. The sealant layer was a blend of plastomer, density 0.902 g/cc, melt index 1.2 and ULDPE, density 0.905 g/cc, melt index 0.8.

Figure 4:
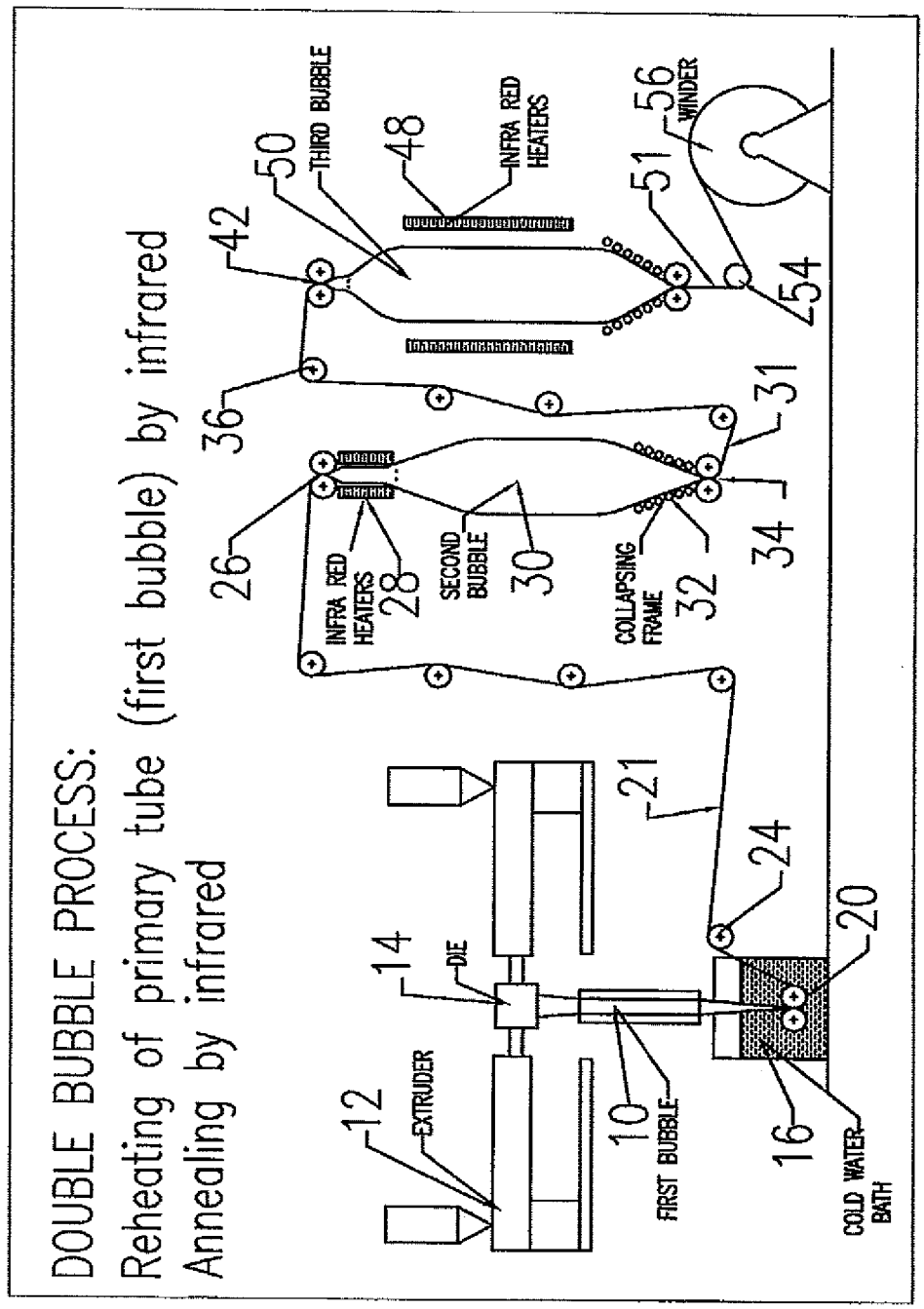
FIG. 4 is a schematic drawing showing the production of biaxially oriented heat shrinkable multilayer plastic film in accordance with one embodiment of the invention by means of a double bubble blown process using infrared as reheating system for primary tube and infrared as annealing system for third bubble.

The multilayer film was produced using the double bubble method with annealing as shown in FIG. 4, using eleven extruders 12 (only one is shown). The polymers were sequentially extruded by extruders 12, fed to an annular die 14, and primary tube of eleven layers was extruded downwardly therefrom. The eleven layer primary tube was cooled in a cold water tank 16 located under the die 14 and containing water at a temperature of about 25° C. or lower. The bubble 10 formed by a multilayer primary tube was squeezed by nip roll 20 in the cold water tank 16 to collapse the film from bubble form to sheet form 21. The cold water in the tank 16 quenched the primary tube to maintain the amorphous state of the plastic material and to lower the temperature thereof so that substantially no crystalline growth occurred in the polymers of the primary tube which would inhibit the subsequent process of orientation.

The collapsed primary tube 21 was passed over idler rolls 24 and through a pair of nip rolls 26. The collapsed film 21 was then passed from the nip rolls 26 through an infrared heating section 28 and blown to form a second bubble 30, which was subsequently collapsed by a collapsing frame 32. The collapsed film 31 was then passed through a pair of nip rolls 34, which were rotated at three to five times faster than nip rolls 26, with the air in the bubble 30 being entrapped therein by the rolls 26, 34 (nip rollers are opened and air is introduced by blowing air using air nozzle and then nip is closed to trap air between primary and secondary nip rollers). This resulted in biaxial orientation of the film lengthwise (MD) and breadthwise (TD). The collapsed film 31 was then passed over idler rolls 36 and then from nip rolls 42 through an infrared heating section 48 and blown to form a third bubble 50, which was subsequently collapsed by a collapsing frame 43. The collapsed film 51 was then passed through a pair of nip rolls 46, which were rotated slightly slower than nip roll 42 (nip speed depends upon the film structure, for example, it could be from 5 m/min to 500 m/min) with the air in the bubble 50 being entrapped therein by the rolls 42, 46. This results in annealing of film 51; the film is annealed at 110° C. The collapsed film 51 is then passed over further idler rolls 54 and wound in the form of a roll 56. The biaxially oriented heat stabilized low shrink film 51 may be slit (if desired trim removed) to make two rolls.

The resulting bi-axially oriented heat shrinkable film had a physical thickness of 40 microns and showed excellent oxygen, moisture and mechanical properties. The film was flexed 100 times without any visible mechanical cracks appearing. The film was tested for shrinkage and showed a low shrinkage (20%) at 90° C.

Example 4: Double Bubble Process with Annealing for Making Multilayer Film

In another embodiment, a multilayer film (14 layers) with excellent moisture, oxygen barrier and mechanical properties was fabricated having the following structure: PA666/tie/PE-bulk/tie/PVDC/tie/nylon terpolymer/EVOH/nylon terpolymer/tie/PVDC/tie/PE-shrink/sealant layer. The first outer layer was PA666, density 1.12 g/cc, melting point 190° C., thickness 2.5 microns. The bonding tie layer was an ethylene-based copolymer, melt index 2.7, density 0.90 g/cc. The bulk layer was LLDPE, density 0.916, melt index 1.0, thickness 10 microns. The barrier layer included two PVDC layers for oxygen and moisture barrier (VdC content—98%), MA-based copolymer, thickness of each PVDC layer was 2 microns, and a central EVOH layer (ethylene 38 mole %), density 1.17 g/cc, thickness 1.5 microns with nylon terpolymer on both sides of EVOH having a solution viscosity of 4.05 in 96% $H_2SO_4$, melting point 185° C., thickness 2 microns each layer. The tie layers in the barrier layer were ethylene-based copolymer, thickness 1.5 microns. The shrink layer was a plastomer, density 0.902, melt index 1.0. The sealant layer was a blend of plastomer (density 0.902 g/cc, melt index 1.2) and ULDPE (density 0.905 g/cc, melt index 0.8).

The resulting bi-axially oriented heat shrinkable film had a physical thickness of 45 microns and showed excellent oxygen, moisture and mechanical properties. The film was flexed 100 times without any visible mechanical cracks appearing. The film was tested for shrinkage and showed a medium shrinkage (30%) at 90° C.

The invention claimed is:

1. A multilayer film comprising:
   a central barrier layer comprising first and second layers of a polyvinylidene chloride (PVDC) polymer, wherein the central barrier layer additionally comprises an ethylene vinyl alcohol (EVOH) layer and/or a polyamide layer which may be blended with polyvinyl acetate (PVA), optionally bonded to one or more of the PVDC layers with a bonding layer;
   an outer layer adjacent to an outer side of the first polyvinylidene chloride layer;
   a sealant layer adjacent to an outer side of the second polyvinylidene chloride layer; and
   a shrink layer in between the sealant layer and the second polyvinylidene chloride layer having a thickness in the range of from about 2 to about 50 microns, wherein the shrink layer comprises at least one material selected from the group consisting of elastomers, plastomers, polypropylene copolymer, or terpolymer; or a blend of low density polyethylene (LDPE), linear low density polyethylene (LLDPE), metallocene LLDPE (mLLDPE), very low density polyethylene (VLDPE), metallocene polyethylene (mPE), single site metallocene catalyst (SSC)-based LLDPE, ethylene-vinyl acetate (EVA), ethylene methacrylate (EMA), acid polymers, network polymers, ionomers with a melt index (MI) of from about 0.5 MI to 10 MI, and blends of these.

2. The multilayer plastic film according to claim 1, wherein each PVDC layer comprises from about 90 to about 98% by weight of vinylidene chloride.

3. The multilayer plastic film according to claim 1, wherein the PVDC layers comprise at least one copolymer selected from the group consisting of vinylidene chloride-methyl acrylate copolymer, vinylidene chloride-vinyl chloride copolymer and vinylidene chloride-acrylic acid copolymer.

4. The multilayer plastic film according to claim 1, wherein each PVDC layer has a thickness in the range of from about 1 to about 25 microns.

5. The multilayer plastic film according to claim 1, wherein the outer layer has a thickness in the range from about 1.5 to about 20 microns.

6. The multilayer plastic film according to claim 1, wherein the outer layer comprises a heat resistant polymer having a melting point in the range of 190° C. to 265° C.

7. The multilayer plastic film according to claim 6, wherein the heat resistant polymer is selected from the group consisting of polychlorotrifluoroethene (PCTFE), polyvinylidene fluoride (PVDF) copolymer, polyethylene terephthalate (PET), polyethylene terephthalate glycol-modified (PETG), high density polyethylene (HDPE), PETG/PET, polyolefin (PO), polypropylene (PP), amorphous polyethylene terpthalate (APET), polyethylene naphthalate (PEN), polybutylene terephthalate (PBT), PLA (polylactic acid), COC, polyolefin, blends of COC with PE or PP (homopolymer or copolymer), copolymers of VDF (vinylidene fluoride) with hydrofluoroethene (HFE), nylons (polyamide polymers) and blends thereof.

8. The multilayer plastic film according to claim 1, additionally comprising a bulk layer in between the outer layer and the first polyvinylidene chloride layer having a thickness in the range of from about 10 to about 50 microns and comprising one or more polyolefins having a density in the range of about 0.88 g/cc to 1.04 g/cc, and a melt index (MI) of from about 0.5 MI to 10 MI.

9. The multilayer plastic film according to claim 8, wherein the bulk layer comprises one or more polymers selected from the group consisting of elastomers, plastomers, polypropylene homopolymer, copolymer, or terpolymer; styrene-based copolymers, polystyrene, styrene block copolymer (SBC), low density polyethylene (LDPE), cyclic olefin copolymer (COC), acid polymers, high density polyethylene (HDPE), linear low density polyethylene (LLDPE), metallocene LLDPE (mLLDPE), very low density polyethylene (VLDPE), metallocene polyethylene (mPE), high density polyethylene (HDPE), single site metallocene catalyst (SSC)-based LLDPE, ethylene-vinyl acetate (EVA), ethylene methacrylate (EMA), octene-LL, hexene-LL, butene-LL, ionomers, and blends of any of these polymers.

10. The multilayer plastic film according to claim 1, wherein the sealant layer has a thickness in the range from about 10 to about 50 microns and comprises one or more polyolefins having a seal strength from about 2 to 20 lbs/inch and a density of 0.88 g/cc to 0.920 g/cc.

11. The multilayer plastic film according to claim 1, wherein the sealant layer comprises one or more polymers selected from the group consisting of elastomers, plastomers, polyethylene (PE), polyolefin (PO), polypropylene homopolymer, copolymer, or terpolymer; or a blend of low density polyethylene (LDPE), medium density polyethylene (HDPE), linear low density polyethylene (LLDPE), metallocene LLDPE (mLLDPE), very low density polyethylene (VLDPE), metallocene polyethylene (mPE), high density polyethylene (HDPE), single site metallocene catalyst (SSC)-based LLDPE, ultra low density PE (ULDPE), ethylene-vinyl acetate (EVA), ethylene methacrylate (EMA), ethylene acrylic acid (EAA), ethylene methacrylic acid, ethylene methyl acrylate copolymer (EMAC), salts of ethylene acrylic acid or methacrylic acid, acid co-polymers, ionomers and blends of any of these.

12. The multilayer plastic film according to claim 1, wherein the bonding layers have a thickness in the range of from about 3 to about 12 microns.

13. The multilayer plastic film according to claim 1, comprising a bonding layer between each layer.

14. The multilayer plastic film according to claim 1, wherein the bonding layers comprise one or more polymers selected from the group consisting of ethylene vinyl acetate, ethylene methyl-acrylate, ethylene-acrylic acid copolymer, maleic anhydride-modified polyethylene, maleic anhydride-modified EVA, maleic anhydride-modified EMA, acid copolymer, or polymer blends with PP, HDPE, COC or LLDPE.

15. The multilayer plastic film according to claim 1, wherein the thickness of said multilayer film is in the range of from about 10 to about 250 microns.

16. The multilayer plastic film according to claim 1, wherein the film exhibits a shrinkage of from about 5% to 40% at 90° C.

17. The multilayer plastic film according to claim 1, wherein the EVOH layer comprises hydrolyzed ethylene-vinyl acetate copolymer exhibiting saponification of up to or greater than 98%, with an ethylene content from about 25 to 48 mole percent and a melt index (MI) of from about 0.5 MI to 10 MI.

18. The multilayer plastic film according to claim 1, wherein the thickness of the central barrier layer is in the range of from about 3 microns to 200 microns.

19. The multilayer plastic film according to claim 1, wherein the thickness of the EVOH layer is in the range of about 1 to 20 microns and the thickness of each polyamide layer is from about 1 to 15 microns.

20. The multilayer plastic film according to claim 1, which is selected from the group consisting of:
PETG/tie/PVDC/tie/Nylon/tie/PVDC/tie/Sealant;
PETG/tie/PVDC/tie/Nylon+PVA/tie/PVDC/tie/Sealant;
PETG/tie/PVDC/tie/PA/EVOH/PA/tie/PVDC/tie/Sealant;
PA/tie/PVDC/tie/PA/EVOH/PA/tie/PVDC/tie/Sealant;
PVdF/tie/PVDC/tie/PA/EVOH/PA/tie/PVDC/tie/Sealant;
PETG/tie/PE-bulk/tie/PVDC/tie/PA/EVOH/PA/tie/PVDC/tie/Sealant;
PETG/tie/PE-bulk/tie/PVDC/tie/PA/EVOH/PA/tie/PVDC/tie/PE-shrink/Sealant;
PETG/tie/PVDC/Tie Encapsulating EVOH/PVDC/tie/Sealant;
PETG/tie/PVDC/tie/PA Encapsulating EVOH/tie/PVDC/tie/Sealant;
PA/tie/PVDC/tie/PA Encapsulating EVOH/tie/PVDC/tie/Sealant;
PETG/tie/PE/EVA/PVDC/tie/Nylon/EVOH/Nylon/tie/PVDC/tie/PE/Sealant; and
PETG/tie/COC+PE/PE/EVA/PVDC/tie/Nylon/EVOH/Nylon/tie/PVDC/tie/COC+PE/PE/Sealant.

* * * * *